United States Patent [19]
Stefansson et al.

[11] Patent Number: 5,531,460
[45] Date of Patent: Jul. 2, 1996

[54] U-SHAPED SEALING DEVICE ON A PIPE

[75] Inventors: Lars Stefansson; Kenneth Lennartsson, both of Torekov, Sweden

[73] Assignee: Lindab Aktiebolag, Bastad, Sweden

[21] Appl. No.: 173,767

[22] Filed: Dec. 27, 1993

[30] Foreign Application Priority Data

Dec. 28, 1992 [SE] Sweden .................................. 9203911

[51] Int. Cl.⁶ .................................................. F16J 15/10
[52] U.S. Cl. .................................. 277/206 R; 277/207 A; 285/231
[58] Field of Search ............................ 277/9, 9.5, 206 R, 277/207 A; 285/108, 231, 345, 346, 347, 379

[56] References Cited

U.S. PATENT DOCUMENTS

| | | | |
|---|---|---|---|
| 1,306,476 | 6/1919 | Frey | 285/345 X |
| 2,314,386 | 3/1943 | Brend | 285/379 X |
| 2,469,516 | 5/1949 | Pearson | 285/345 X |
| 2,547,185 | 4/1951 | Von Bolhar | 277/206 R X |
| 2,777,715 | 1/1957 | Beyer | 277/206 R X |
| 3,174,761 | 3/1965 | Workman | 277/206 R X |
| 3,544,119 | 12/1970 | Glover | 285/345 X |
| 3,768,819 | 10/1973 | Bürkert | 277/206 R |
| 3,955,834 | 5/1976 | Ahlrot | 285/110 |
| 4,050,703 | 9/1977 | Tuvesson et al. | 277/207 |
| 4,579,354 | 4/1986 | Vassallo et al. | 277/207 A |
| 4,666,165 | 5/1987 | Nordin | 285/379 X |
| 5,002,290 | 3/1991 | Pernin | 277/206 R X |

*Primary Examiner*—Scott W. Cummings
*Attorney, Agent, or Firm*—Weingarten, Schurgin, Gagnebin & Hayes

[57] ABSTRACT

A sealing device on a pipe includes an elastic sealing ring of generally U-shaped cross-section, which is clamped on the pipe by a clamping strap. The U-flanges of the sealing ring are so loaded by the pressure exerted by the clamping strap on the U-web of the sealing ring as to occupy a substantially radial position.

6 Claims, 2 Drawing Sheets

U-SHAPED SEALING DEVICE ON A PIPE

FIELD OF THE INVENTION

The present invention relates to a sealing device on a pipe, and more specifically to a device according to the preamble of appended claim 1, which is based on the prior art disclosed in U.S. Pat. No. 4,050,703.

The invention also relates to a sealing ring included in the sealing device, according to the preambles of appended claims 2 and 5, which is based on a variant of the solution disclosed in the above-mentioned U.S. patent.

DESCRIPTION OF THE PRIOR ART

The problem of achieving a seal between two pipes inserted in each other has long been addressed by those skilled in the art. During the last decades, a number of different solutions have been suggested to solve the specific problem of providing a seal between two ventilation ducts inserted in each other with close fit. In most cases, the preferred option is to fix an elastic sealing ring, generally of rubber, outside as well as inside the end portion of the first pipe where the other pipe is to be connected. Thus, the sealing ring is applied on the inner tube, and generally has one or two radially projecting flanges which are bent by the outer tube when this is passed on to the inner tube.

U.S. Pat. No. 4,050,703, hereby incorporated by reference, discloses a double-lip seal of U-shaped cross-section, which is anchored in a circumferential groove in a pipe. The seal has a web which is applied against the outer side of the pipe, and two sealing lips projecting from the web and extending radially outwards from the pipe. The web applied to the outer side of the pipe is fastened by a clamping strap being placed on the web of the seal and tightened so as to urge the U-web against the outer side of the pipe, whereupon the clamping strap is anchored by spot welding. The sealing lips projecting radially from the pipe are bent sideways when the pipe is inserted in an outer pipe with close fit. The sealing effect is achieved by a portion of the respective sealing lip tightly engaging the inner side of the outer pipe, while the web is pressed against the outer side of the inner pipe.

In terms of sealing, this solution is quite excellent, but when automatically fastening the sealing strip, problems are caused by the tendency of the clamping strap, when being applied, to be laid over either of the sealing lips. Since the distance between the substantially parallel, radially-projecting sealing lips corresponds to the width of the clamping strap, the application of the strap on the seal web requires great accuracy to avoid that any of the sealing lips interferes with the strap. Moreover, sectional elements that are extruded and spliced by curing tend to slant, i.e. the sealing lips tend to be slightly angled, this making it still more difficult to apply the clamping strap correctly.

An alterantive embodiment of a double-lip seal, which also represents the background art, is shown in FIGS. 1–2 of the drawings, where FIG. 1 is a section showing the sealing ring secured to a pipe, while FIG. 2 is a section showing the pipe provided with the sealing ring inserted in an outer pipe.

This prior-art sealing ring has, like the above-mentioned double.-lip seal, a generally U-shaped cross-section including a U-web 1 and two sealing lips 2 and 3 projecting from the web 1. The sealing ring is secured on the outside of a pipe 4 by means of a clamping strap 5.

As opposed to the double-lip seal shown in U.S. Pat. No. 4,050,703, the sealing lips 2 and 3 shown in FIG. 1 are however divergent, this facilitating the application of a clamping strap on the web of the seal. On the other hand, this solution suffers from other drawbacks. The major one is that the sealing lips, when being inserted in an outer pipe, are bent to a different extent owing to their divergence.

It appears from FIG. 2 that the inner sealing lip 2, when the pipe 4 is inserted in an outer pipe 6, has a significantly smaller surface engaging the inner side of the outer pipe 6 than the outer sealing lip 3, the two sealing lips thus producing an uneven sealing effect. Thus, if the sealing lip 3, producing the better sealing effect, is damaged, the overall sealing capacity is reduced by at least half, this considerably increasing the risk of leakage.

Moreover, the outer sealing lip 3 is subjected to increased bending stress in the transition area between the lip and the web 1, which accelerates the ageing of the sealing ring material and adversely affects the resilience of the sealing ring. It will thus be appreciated that the increase in bending stress increases the risk of damage to the sealing lip, this increasing the risk of leakage.

The known sealing rings described above also show poor dimensional stability, i.e. they are flabby, which is a problem when taking sealing rings from a store where the rings are mechanically separated. Also, it is difficult to correctly position the rings prior to automatic application thereof.

There is thus a need for an improved sealing ring which obviates the above-mentioned drawbacks.

SUMMARY OF THE INVENTION

One object of the present invention therefore is to overcome the above-mentioned drawbacks by providing a sealing device for a pipe that produces an even sealing effect while facilitating the application of a clamping strap to the web of the seal.

Another object of the invention is to provide a sealing ring which produces an even sealing effect and facilitates the application of a clamping strap on the web of the sealing ring.

Yet another object of the invention is to provide a sealing ring having improved dimensional stability to facilitate separation and positioning of the ring.

A still further object of the invention is to provide a pipe or duct having a seal which, with unimpaired sealing effect, is easier to mount than heretofore possible.

These and other objects, which will appear from the following description, have now been achieved by means of a sealing device which is of the type described in the introductory part of the description and which additionally has the inventive features recited in the characterising clause of appended claim 1.

The objects of the invention are also achieved by means of a sealing ring which is of the type discussed in the introductory part of the description and which additionally has the inventive features recited in the characterising clauses of appended claims 2 and 5.

The objects of the invention are further achieved by means of a pipe according to appended claim 8.

Other features of the invention appear from the dependent claims reciting preferred embodiments thereof.

The invention confers several advantages. By the design of the sealing ring according to the invention, the sealing lips will not interfere with the clamping strap when this is being applied on the seal web, and both sealing lips will produce the same sealing effect.

The design of the web also provides a sealing ring having improved dimensional stability, which facilitates separation and positioning of the sealing rings. This is a major advantage in automatic application of the sealing ring on the outside of a pipe.

BRIEF DESCRIPTION OF THE DRAWINGS

Preferred embodiments of the invention will be described by way of example hereinafter with reference to the accompanying drawings.

DESCRIPTION OF THE PREFERRED EMBODIMENTS

Figure 1:
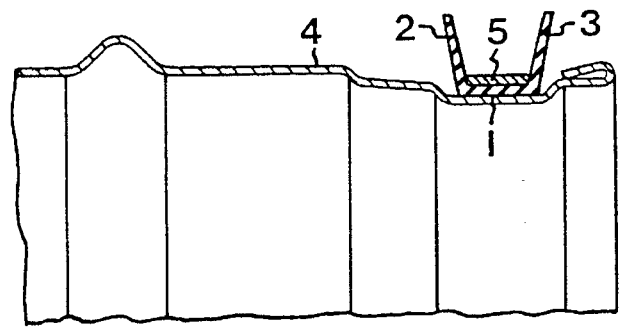
FIGS. 1–2 are partial longitudinal sections of a prior-art sealing device.
Figure 2:
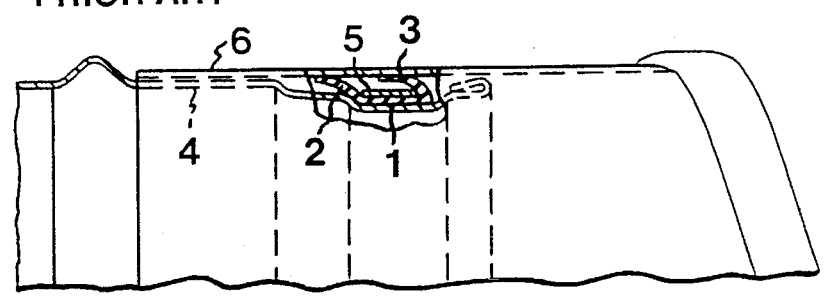
Figure 3:
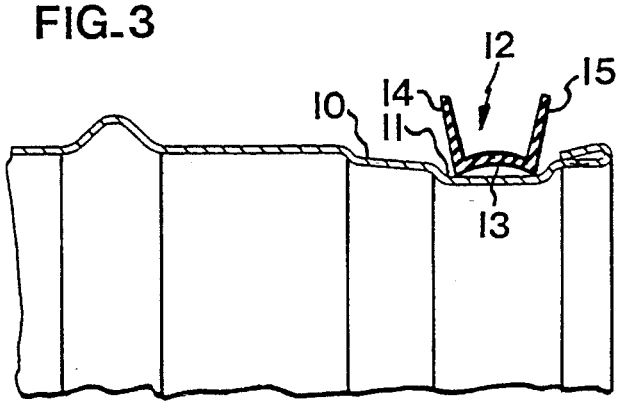
FIG. 3 is a cross-section of a sealing ring according to the invention, which is applied against the outer side of a pipe shown in partial longitudinal section.
Figure 4:
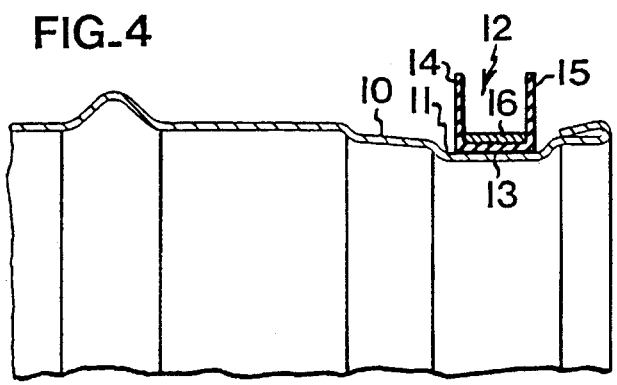
FIG. 4 is a view, similar to FIG. 1, of the sealing ring according to the invention after a clamping strap has been applied.

FIGS. 3–4 show a sealing device according to one embodiment of the invention. A pipe 10, which is intended to be partially inserted in another pipe to form e.g. a ventilation duct, has in conventional manner a circumferential groove 11 having a smaller diameter than the rest of the pipe 10. A sealing ring, generally designated 12, is placed on the pipe 10 and intended to be secured to it, so as to form a seal in the joint between the two pipes inserted in each other. The sealing ring 12, preferably consisting of rubber, has a base portion or web 13 which, when fastened, engages in its entirety the bottom of the circumferential groove 11, and two sealing lips 14, 15 projecting from the web 13 and, in FIG. 3, diverging away from the pipe 10.

The sealing ring 12 has substantially U-shaped cross-section. The web 13 located between the sealing lips 14, 15 is curved and retracted towards the space defined between the sealing lips 14, 15 so as to be situated, before being fastened on the pipe 10, at a distance from the bottom of the circumferential groove 11 with its central portion remotest from the pipe.

FIG. 4 shows the sealing ring 12 after being fastened. On the web 13 of the sealing ring 12 is applied a clamping strap 16 which, when being tightened, presses the web 13 bulging from the pipe 10 completely flat against the bottom of the groove 11. As a result of the web 13 being forcibly pressed against the bottom of the groove 11, the sealing lips 14, 15 will be moved closer to each other thanks to the design of the web 13. Thus, once fastened, the sealing lips will extend radially outwards from the outer side of the pipe 10 substantially parallel to each other.

It should be pointed out that the sealing ring 12 according to this first embodiment need not necessarily be disposed in a groove but may instead be mounted anywhere on the pipe 10.

Figure 5:
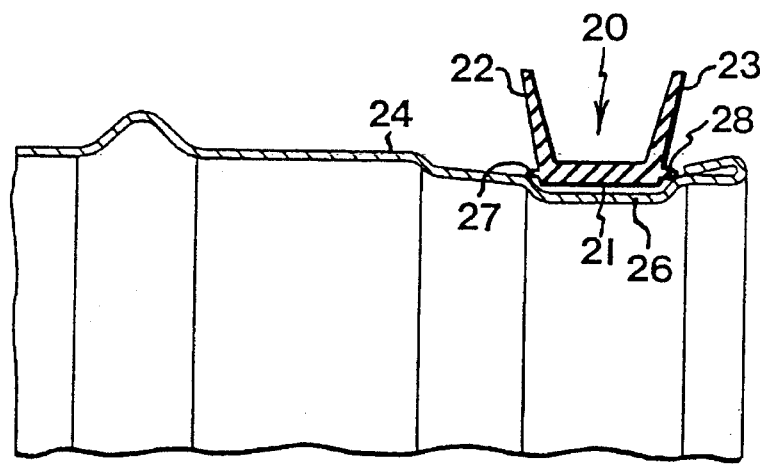
FIG. 5 is a view, similar to FIG. 3, of a sealing ring according to an alternative embodiment of the invention.
Figure 6:
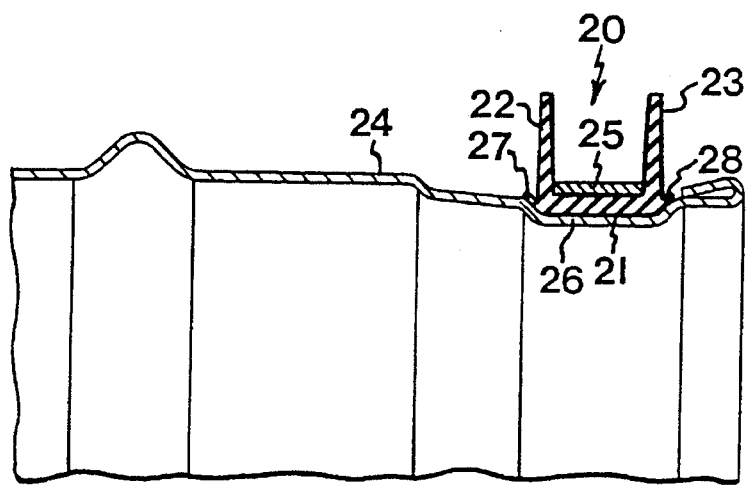
FIG. 6 is a view, similar to FIG. 4, of the sealing ring in FIG. 5 after a clamping strap has been applied.

An alternative embodiment of the sealing ring according to the invention is shown in FIGS. 5–6. A sealing ring, generally designated 20, has, like the embodiment described above, a substantially U-shaped cross-section including a web 21 and two sealing lips 22, 23. As in the embodiment described above, the web 21 is intended to be applied to the outer side of a pipe 24 in a circumferential groove 26. In FIG. 5, the sealing lips 22, 23 are divergent outwards from the web 21 away from the pipe 24. Projections in the form of flanges 27, 28 are provided in the respective transition areas between the web 21 and the sealing lips 22, 23. The flanges 27, 28 project from the transition areas towards the opposite walls of the groove 26 and engage these walls, such that the web 21 of the sealing ring 20, prior to fastening, is spaced in its entirety from the bottom of the groove 26.

When the sealing ring 20 has been secured to the pipe 24, as shown in FIG. 6, a clamping strap 25 forcibly urges the web 21 down against the outside of the pipe 24 in the circumferential groove 26, so that the web 21 is clamped against the groove 26 and the flanges 27, 28 are deformed in such a manner as to snugly follow the opposite walls of the circumferential groove 26. This is achieved by tightening the clamping strap 25 round the pipe 24 and fixing it, e.g. by spot welding. When pressing the web 21 against the outer side of the pipe 24, the sealing lips 22, 23 are caused to extend substantially radially outwards away from the pipe and occupy a position substantially parallel to each other, whereby to produce a uniform sealing effect. According to this variant, highly efficient sealing against the walls of the groove 26 is achieved. Before applying the clamping strap 25, the flanges 27, 28 are located substantially in the centre plane of the U-web 21, and are substantially parallel to the longitudinal axis of the pipe 24.

As will have been appreciated, the embodiments of the invention described above yield substantial advantages. Major advantages are that a sealing device according to the invention produces a uniform sealing effect by the sealing lips, and that correct placement of the clamping strap between the sealing lips is facilitated.

Moreover, the sealing ring according to the invention exhibits improved dimensional stability as compared with conventional sealing rings thanks to its special cross-sectional shape, which is also an advantage when separating and positioning the sealing rings.

Figure 7:
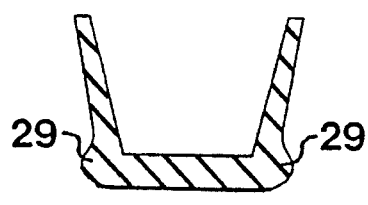
FIGS. 7 and 8 are cross-sectional views of two further variants of sealing rings according to the invention.

To conclude, it should be pointed out that the inventive concept is by no means restricted to the embodiments described in the foregoing, but several modifications are conceivable within the scope of the inventive idea appearing from the appended claims. In particular, it should be noted that the sealing ring may have many different cross-sectional shapes within the scope of the invention. One example hereof (FIG. 7) is that the projections which consist of flanges in the alternative embodiment described above can be replaced by outwardly directed beads 29 or thickened portions which are also provided in the transition areas between the web and the sealing lips.

Figure 8:
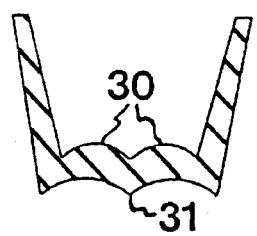

In a variant (FIG. 8) of the first embodiment, the web of the sealing ring is undulate, that is, has two curved portions 30 and a central pointed portion 31 to be applied against the pipe.

Of course, the cross-sectional shape of the sealing ring is dependent on manufacturing considerations, and on the pressure to which the sealing ring is subjected in use. The essential point is that the force applied to the U-web tends to move the free ends of the U-flanges towards each other.

In addition, the seal may have more than two lips, in which case clamping straps are suitably tightened round all the base portions between the lips for reliable anchorage of the seal.

What we claim and desire to secure by Letters Patent is:

1. A sealing ring having a generally U-shaped cross-section comprising U-flanges connected by a U-web, the U-web in an unbiased state being retracted towards a space defined the U-flanges causing free ends of the U-flanges to diverge from the U-web, wherein force applied to the U-web, tends to move the free ends of the U-flanges towards each other.

2. A sealing ring as claimed in claim 1, wherein the U-web is curved in its unbiased state.

3. A sealing ring as claimed in claim 1, wherein the U-web is undulate in its unbiased state.

4. A sealing ring including U-flanges connected by a U-web, the sealing ring having a generally U-shaped cross-section clamped to a pipe in a circumferential groove by the action of a force applied to the U-web, the U-flanges having free ends diverging away from the U-web before said force is applied, said sealing ring comprising external projections provided in respective transition areas between the U-web and the U-flanges and intended to be applied against the walls of the groove, said force tending via said projections, to move the free ends of the U-flanges towards each other.

5. A sealing ring as claimed in claim 4, wherein the external projections consist of flanges which are located substantially in a center plane of the U-web and which are substantially parallel to a longitudinal axis of the pipe.

6. A sealing ring as claimed in claim 4, wherein the external projections consist of outwardly directed beads.

* * * * *

UNITED STATES PATENT AND TRADEMARK OFFICE
CERTIFICATE OF CORRECTION

PATENT NO. : 5,531,460
DATED : July 2, 1996
INVENTOR(S) : Lars Stefansson, et al It is certified that error appears in the above-indentified patent and that said Letters Patent is hereby corrected as shown below:

On the cover page, at item [30] "Foreign Application Priority Date", the application number reads "9203911" and it should read --9203911-4 --.

Column 1, line 56, "this making" should read --thus making--.

Column 2, line 14, "this considerably" should read --thus considerably--.

Column 2, line 22, "lip, this" should read --lip, thus--.

Column 5, line 7, "defined the" should read --defined between the--.

Signed and Sealed this

Twelfth Day of November, 1996

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,531,460
DATED : July 2, 1996
INVENTOR(S) : Lars Stefansson et al

It is certified that error appears in the above-indentified patent and that said Letters Patent is hereby corrected as shown below:

Column 1, line 6, delete "device" and insert --ring--.

Column 1, lines 10-13, delete "The invention also relates to a sealing ring included in the sealing device, according to the preambles of appended claims 2 and 5, which is based on a variant of the solution disclosed in the above-mentioned U.S. patent."

Column 2, lines 49-54, delete "These and other objects, which will appear from the following description, have now been achieved by means of a sealing device which is of the type described in the introductory part of the description and which additionally has the inventive features recited in the characterising clause of appended claim 1."

Column 2, line 59, delete "2 and 5" and insert --1 and 4--.

Column 2, lines 60-61, delete "The objects of the invention are further achieved by means of a pipe according to appended claim 8."

Signed and Sealed this

Eighteenth Day of March, 1997

Attest:

BRUCE LEHMAN

*Attesting Officer*      *Commissioner of Patents and Trademarks*